(No Model.) 2 Sheets—Sheet 1.

J. BURNS.
DRAG SAW.

No. 329,886. Patented Nov. 10, 1885.

Witnesses

Inventor.
James Burns.

(No Model.) 2 Sheets—Sheet 2.
J. BURNS.
DRAG SAW.
No. 329,886. Patented Nov. 10, 1885.
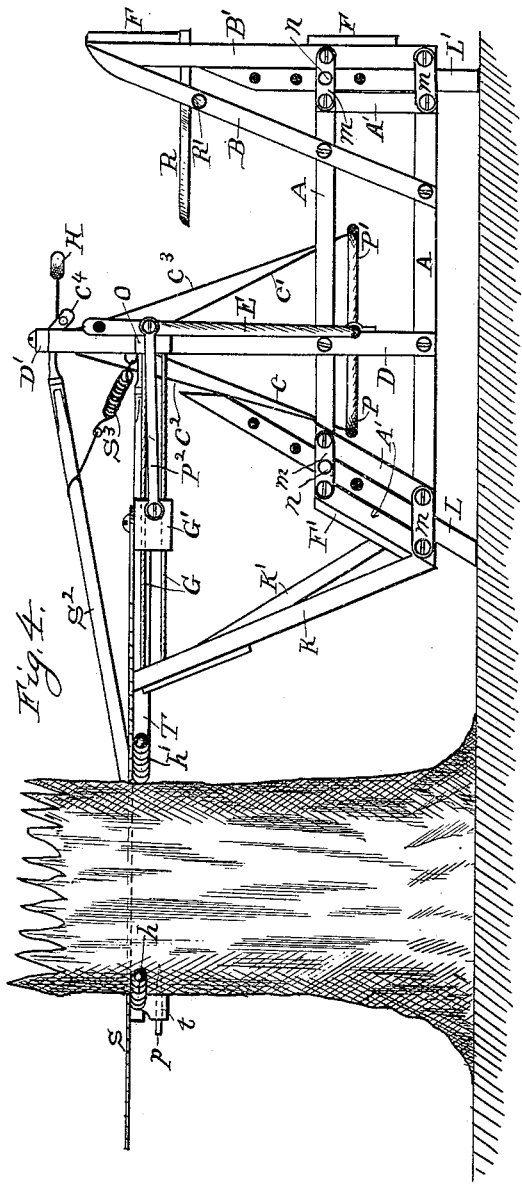
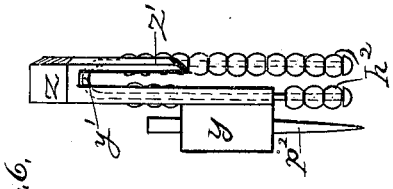
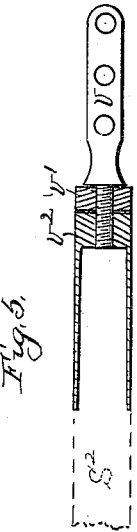
Witnesses,
Thos. H. Hutchins.
Wm. J. Hutchins.
Inventor.
James Burns.

UNITED STATES PATENT OFFICE.

JAMES BURNS, OF CHICAGO, ILLINOIS.

DRAG-SAW.

SPECIFICATION forming part of Letters Patent No. 329,886, dated November 10, 1885.

Application filed March 12, 1885. Serial No. 158,517. (No model.)

*To all whom it may concern:*

Be it known that I, JAMES BURNS, a citizen of the United States of America, residing at Chicago, in the county of Cook and State of Illinois, have invented certain new and useful Improvements in Drag-Saws, of which the following is a specification, reference being had therein to the accompanying drawings.

Figure 1:
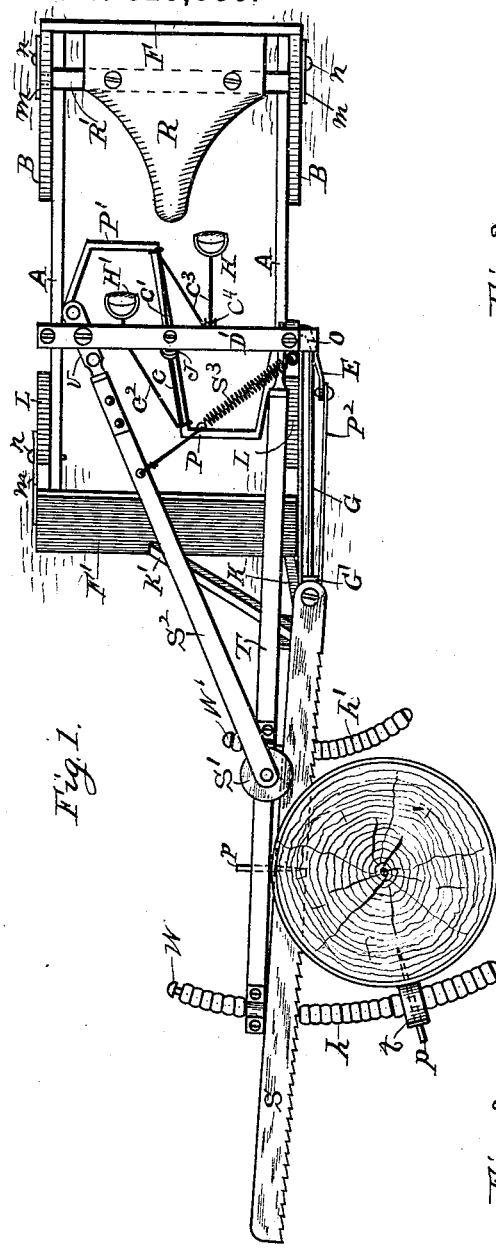
Figure 2:
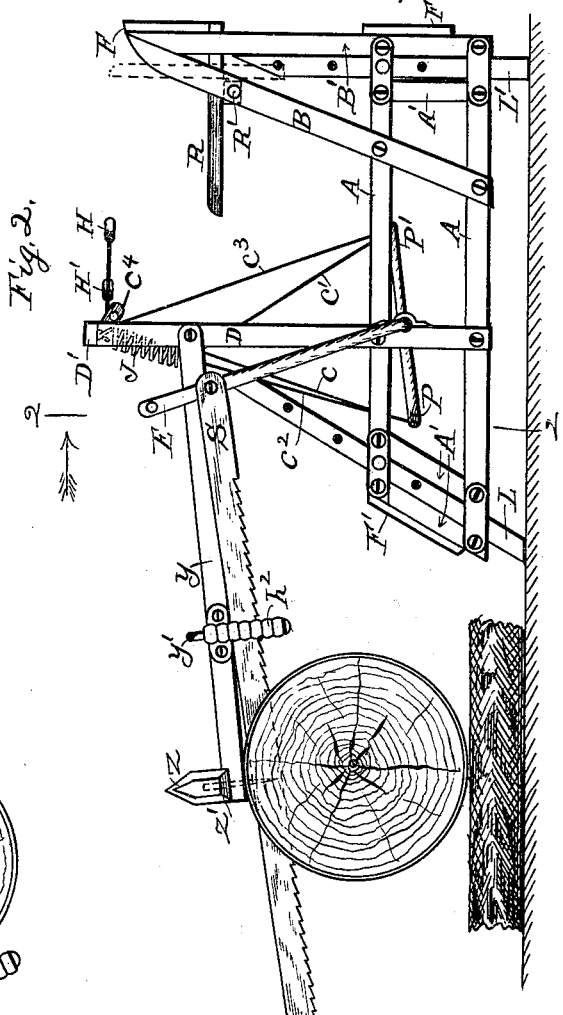
Figure 3:
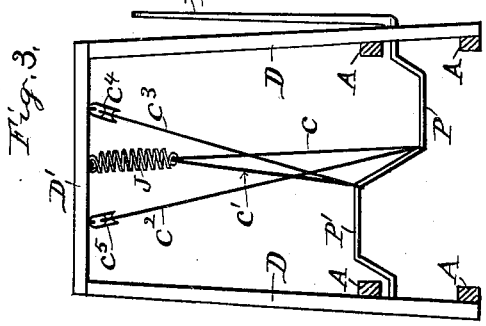

Figure 1 is a plan view on the top of the machine as it would appear in the act of sawing off a standing tree. Fig. 2 is a side elevation of the machine as it would appear arranged to saw a horizontal log. Fig. 3 is a vertical cross-sectional view of Fig. 2 on line 2, looking in the direction of the arrow. Fig. 4 is a side elevation of the machine as it would appear in the act of sawing a standing tree. Fig. 5 is a longitudinal section of the coupling for attaching the connecting-bar and pressure-arm to the frame, and Fig. 6 is a view on the outer end of the bar that connects the machine with a horizontal log.

This invention relates to certain improvements in drag-saws, which are fully set forth and described in the following specification and claims.

Referring to the drawings, the working parts of the machine are supported in the frame consisting of the beams A A' B B' F D D', which frame is provided with legs L L', one at each of its four corners, which legs are adapted to be elevated or lowered and held by means of pins passing through them, and held at any place desired to regulate the height of the frame and cause it to stand level. These legs are attached to the frame, as shown in Figs. 2 and 4, and held in place between the beams A' B' by means of the side plates, $m$. The rear and upper part of the frame is provided with a rocking bar R', pivoted in the beams B, upon which rock-bar is secured the operator's seat R, the rear end of which is secured under the cross-beam F, to hold it in a horizontal position, as shown in Figs. 1, 2, 4.

The seat R may be tilted upward to stand vertically, as shown by dotted lines in Fig. 2, when it is desired to remove it, so the operator may stand on the ground within the frame, to carry it about by grasping the beams A A. The form of the seat is shown in Fig. 1, and is such that the operator strides it something like a saddle. In front of said seat, and between the vertical beams D D, near their lower end, and boxed thereto, is a cross rock-shaft bent to form two foot-cranks, P P', as shown in Fig. 3, for the feet of the operator to rest upon. Attached to each crank is a cord, $c^2$ $c^3$, passing up over the pulleys $c^4$ $c^5$ pendent upon the cross-bar D'. The upper ends of these cords are each provided with hand-grasps H and H', as shown in Figs. 1, 2, and 4, for the operator to grasp with his hands, and, by means of said cords, assist the feet in operating said cranks. The cords $c^2$ $c^3$ cross each other to pass over the pulley over the opposite crank, as shown in Fig. 3, so that when the operator presses one crank down he can pull up on the other by means of the cord attached to it, and by the use of his arm on the side of his operating-foot, so that the hands and arms assist the feet in operating the cranks and all the power of the operator exerted immediately on the cranks, so that no power is lost. Immediately above the center of said cranks is suspended a coil-spring, J, having a pair of equi-length cords, $c\,c'$, attached to its lower end, one of which cords attach to each crank, as shown particularly in Fig. 3, the tendency of which spring and cords is to hold said cranks in a horizontal position. Looking at Fig. 3, if crank P were depressed it would give tension to cord $c$ and spring J, and slacken cord $c'$, attached to crank P'. When pressure is released from crank P, the tension of spring J will assist in returning it. The same may be said with regard to crank P', so that the spring J and cords $c\,c'$ may be said to be for the purpose of assisting in operating said cranks, as stated. One outer end of said crank rock-shaft terminates in or may have attached to it the upwardly-extending crank-arm E, (shown in Figs. 1, 2, 3, 4,) to or near the upper end of which attaches the saw-pitman P², as shown in Figs. 1 and 4.

When cranks P and P' are operated as above stated, crank-arm E will impart a reciprocating motion to saw S by means of its attachment to crank-arm E, through the medium of pitman P² and slide G', to cause it to do its work.

Figs. 1 and 4 represent the machine as it appears arranged to saw horizontally and in the act of sawing off a standing tree. The connecting bar or arm T attaches the machine to the tree to hold the machine stationary. The inner end of said arm is pivoted to the beam D of the frame, and its outer end is secured to the tree by means of a pin, $p$, as shown in Fig. 1. This arm T is provided with a pair of arms, $w\ w'$, curved on a radius with the inner end of the saw, and attached to and located thereon, as shown in Fig. 1, one at either side of the tree to be cut. These arms are circular in cross-section, and are provided their entire length with a row of friction-rollers strung thereon, as shown in Fig. 1. These arms and rollers are for the purpose of supporting the saw and guiding it so it will saw straight.

The saw is held up to its work by means of pressure against its back through the medium of the presser-arm $S^2$, pivoted at its inner end to the frame D', and having its outer end provided with a sheave-wheel, S', that rides on the back of the saw-blade S. A coil-spring, $S^3$, connects the frame of the machine with said presser-arm at about its center, and causes the sheave to press heavily on the back of the saw for the purpose stated.

The inner ends of the arms T and $S^2$ are provided with a swivel-joint, such as is shown in Fig. 5, by means of which joints they may be partially rotated to change the angle of the saw-blade, so it may be caused to saw at different angles. The construction of said joints is shown in Fig. 5, and consists of the perforated plate V, having its inner end screw-threaded to screw into the end $V^2$ of said arms. A jam-nut, V', placed on the screw-threaded part of said plate, serves to hold said arms turned at any desired angle. The saw-blade is pivoted to the slide G', which connects, by means of the pitman $P^2$, with crank-arm E. The slide traverses a pair of guide-rods, G G, the outer ends of which are supported by the brace-bars K K'.

When the saw is used as a crosscut-saw, to saw vertically, as shown in Fig. 2, the arms T and $S^2$ are removed and arm $y$ substituted for arm T. This arm attaches the machine to the log, as shown in said figure, and guides the saw when it starts. The pitman $P^2$, guide-rods G, and slide G' are also removed and the saw pivoted directly to the crank-arm E. A saw-guide is attached to the arm $y$ between the log and the frame, and consists of the rod $y'$, bent in the form shown in Fig. 6, and attached by means of one of its legs to the side of said bar or arm, and is provided with a row or series of friction-rollers, $h^2$, between which the saw reciprocates and is steadied and guided.

By such construction it becomes easy for the operator to exert all his power on the saw with the least possible exertion, and the saw can readily be arranged to cut either horizontally or vertically in a few moments with but little change of the parts. The arm $y$ is provided with a head, Z, having a slot formed by the overhanging part Z', in which slot the saw-blade S stands when it starts, and by means of which it is guided at the start.

Having thus described my invention, what I claim as new, and desire to secure by Letters Patent, is as follows, to wit:

1. In the drag-saw shown and described, in combination with frames A and D, the horizontal shaft forming the foot-cranks P P', and having one end turned upward to form the crank-arm E, and journaled in said frame D, cords $c^2\ c^3$, having their lower ends respectively attached to said foot-cranks and their upper ends passing over the pulleys $c^4\ c^5$, and respectively provided with the hand-grasps H H', pulleys $c^4\ c^5$, coil-spring J, cords $c\ c'$, having their lower ends respectively attached to said cranks and their upper ends to said spring, cross-bar D', saw S, having its inner end pivotally attached to crank-arm E, and arm $y$, pivoted at its inner end to frame D and having the guide-rollers $h^2$, as and for the purpose set forth.

2. In the drag-saw shown and described, in combination with frames A D, the horizontal shaft forming the foot-cranks P P', and having one end turned upward to form the crank-arm E, and journaled in said frame D, cords $c^2\ c^3$, having their lower ends respectively attached to said foot-cranks and their upper ends passing over the pulleys $c^4\ c^5$, and respectively provided with the hand-grasps H H', pulleys $c^4\ c^5$, coil-spring J, cords $c\ c'$, having their lower ends respectively attached to said cranks and their upper ends to said spring, cross-bar D', guide rods or ways G, slide G', for traversing said guideways, pitman $P^2$, for connecting said slide with crank-arm E, saw S, having its inner end pivotally attached to said slide, arm T, having its inner end pivotally attached to frame D, and having the saw guide or support $h$ and attaching-pin $p$, arm $S^2$, having the sheave-wheel S' on its outer end to ride on the saw-back, and pivoted at its inner end to cross-bar D', and coil-spring $S^3$, for connecting arm $S^2$ with frame D and cause sheave-wheel S' to bear on the back of the saw-blade S, substantially as set forth.

JAMES BURNS.

Witnesses:
B. VAN BUREN,
JNO. B. BURNS.